US010793110B2

(12) United States Patent
Suda et al.

(10) Patent No.: US 10,793,110 B2
(45) Date of Patent: Oct. 6, 2020

(54) ON-VEHICLE AUTHENTICATION APPARATUS, AUTHENTICATION METHOD AND STORAGE MEDIUM

(71) Applicant: HONDA MOTOR CO., LTD., Minato-ku, Tokyo (JP)

(72) Inventors: Satoshi Suda, Wako (JP); Masashi Sato, Wako (JP); Shinichi Ueda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/299,191

(22) Filed: Mar. 12, 2019

(65) Prior Publication Data

US 2019/0291694 A1  Sep. 26, 2019

(30) Foreign Application Priority Data

Mar. 20, 2018 (JP) ................................ 2018-053419

(51) Int. Cl.
*B60R 25/24* (2013.01)
*G07C 9/00* (2020.01)

(52) U.S. Cl.
CPC ........ *B60R 25/241* (2013.01); *G07C 9/00309* (2013.01); *G07C 2009/00476* (2013.01); *G07C 2009/00539* (2013.01)

(58) Field of Classification Search
CPC .................. B60R 25/24; B60R 25/241; G07C 2009/00476; G07C 2009/00539; G07C 2205/02; G07C 9/00309; G07C 9/00571
See application file for complete search history.

(56) References Cited

U.S. PATENT DOCUMENTS 6,133,649 A * 10/2000 Iwamoto ................. B60R 25/04
                                                    180/287
2009/0045912 A1 * 2/2009 Sakamoto ............. B60R 25/045
                                                    340/5.64

FOREIGN PATENT DOCUMENTS

JP       2005-254868       9/2005
JP       2006-290246      10/2006
              (Continued)

OTHER PUBLICATIONS

Japanese Office Action for Japanese Patent Application No. 2018-053419 dated Nov. 26, 2019.

(Continued)

*Primary Examiner* — Thomas S McCormack
(74) *Attorney, Agent, or Firm* — Amin, Turocy & Watson, LLP

(57) ABSTRACT

A vehicle authentication apparatus including an acquisition unit (65D) configured to acquire information indicating a content of a manipulation on a vehicle from a detection unit mounted on the vehicle; a manipulation determination unit (65E) configured to determine whether a predetermined collaborative manipulation executable by two or more manipulators is performed on the basis of information acquired by the acquisition unit; and an execution unit (65F, 65H) configured to execute a registration process of registering an electronic key of the vehicle in the on-vehicle authentication apparatus or an invalidation process of invalidating the electronic key registered in the on-vehicle authentication apparatus, in a case that it is determined by the manipulation determination unit that the collaborative manipulation is performed.

20 Claims, 10 Drawing Sheets

(56) References Cited

FOREIGN PATENT DOCUMENTS

| | | |
|---|---|---|
| JP | 2013-231281 | 11/2013 |
| JP | 2013-234520 | 11/2013 |
| JP | 2014-184807 | 10/2014 |
| JP | 2016-145509 | 8/2016 |
| KR | 10-2009-0061695 | 6/2009 |

OTHER PUBLICATIONS

Japanese Notice of Allowance for Japanese Patent Application No. 2018-053419 dated Jun. 16, 2020.

* cited by examiner

| VEHICLE BODY NUMBER | DEALER MAIL ADDRESS | USER MAIL ADDRESS | EXECUTION KEY |
|---|---|---|---|
| 00001005 | AAA@abc.com | BBB@abc.com | XXXXYYYY |
| ... | ... | ... | ... |
| ... | ... | ... | ... |
| ... | ... | ... | ... |

| COLLABORATIVE MANIPULATION ID | FIRST MANIPULATION PART | FIRST MANIPULATION | SECOND MANIPULATION PART | SECOND MANIPULATION |
|---|---|---|---|---|
| 001 | START SWITCH | ENGINE ON | TAIL GATE | OPEN |
| 002 | ACCELERATOR PEDAL | STEP ON | BONNET | CLOSE |
| 003 | INNER HANDLE | OPEN | OUTER HANDLE (DIFFERENT SEAT DOOR) | OPEN |
| 004 | TRUNK OPENER | OPEN | DOOR OF DRIVER'S SEAT | CLOSE |
| ... | ... | ... | ... | ... |

| COLLABORATIVE MANIPULATION ID | FIRST MANIPULATION PART | FIRST MANIPULATION | SECOND MANIPULATION PART | SECOND MANIPULATION |
|---|---|---|---|---|
| 101 | INNER HANDLE OF DRIVER'S SEAT | OPEN DOOR | INNER HANDLE OF REAR SEAT | OPEN DOOR |
| 102 | INNER HANDLE OF DRIVER'S SEAT | OPEN DOOR | OUTER HANDLE OF REAR SEAT | CLOSE DOOR |
| 103 | BONNET | CLOSE | TAIL GATE | CLOSE |
| 104 | BONNET | CLOSE | LAMP OF TRUNK ROOM | TURN ON |
| ... | ... | ... | ... | ... |

| VEHICLE TYPE | COLLABORATIVE MANIPULATION ID |
|---|---|
| LIGHT CAR | 101 |
| PASSENGER CAR | 102 |
| MINIVAN | 103 |
| SUV | 104 |
| ... | ... |

| VEHICLE BODY NUMBER | COLLABORATIVE MANIPULATION ID |
|---|---|
| LAST NUMBER IS EVEN NUMBER | 101 |
| LAST NUMBER IS ODD NUMBER | 102 |
| ... | ... |

| DATE AND TIME | COLLABORATIVE MANIPULATION ID |
|---|---|
| DATE IS EVEN NUMBER | 103 |
| DATE IS ODD NUMBER | 104 |
| ... | ... |

ON-VEHICLE AUTHENTICATION APPARATUS, AUTHENTICATION METHOD AND STORAGE MEDIUM

CROSS-REFERENCE TO RELATED APPLICATION

Priority is claimed on Japanese Patent Application No. 2018-053419, filed Mar. 20, 2018, the content of which is incorporated herein by reference.

BACKGROUND

Field of the Invention

The present invention relates to an on-vehicle authentication apparatus, an authentication method, and a program.

Description of Related Art

In recent years, an electronic key has come into wide use as a key of a vehicle. The electronic key and the vehicle are associated in advance by an immobilizer mounted on the vehicle. Association between the vehicle and the electronic key is made in the dealer shop, for example, when the vehicle is delivered or when the electronic key is lost. In the dealer shop, a diagnosis machine connected to the immobilizer via a wire is provided, and in a case where necessary information is input from the diagnosis machine, the immobilizer switches the association between the vehicle and the electronic key to an executable registration mode in an operation mode. When an immobilizer which is operating in the registration mode receives unique key information from the electronic key, the vehicle and the electronic key are associated with each other. For example, a method (a so-called immobilizer cutter) of invalidating the key information of an original regular owner and registering another new type of key information may become a problem.

In this connection, a technique for preventing a clandestine theft from being performed, by registering the key information in the immobilizer on condition that a predetermined operation such as turning a headlamp on or generating a sound with a horn or the like is executed is known, (for example, see Japanese Unexamined Patent Application, First Publication No. 2014-184807).

However, according to the conventional technique, in some cases, the turning-on of the headlamp has been inconspicuous in the daytime, and the sound of the horn has been drowned in a noisy environment such as near a railroad track. In these cases, it was difficult to prevent the clandestine theft of the malicious person. There was a case where a predetermined operation such as generation of a sound with a horn or the like became an annoyance to the surroundings.

Aspects of the present invention have been made in view of such circumstances, and an object thereof is to provide an on-vehicle authentication apparatus, an authentication method, and a storage medium that improve the security of the vehicle.

SUMMARY

The on-vehicle authentication apparatus, the authentication method, and the storage medium according to the present invention adopt the following configuration.

(1) An on-vehicle authentication apparatus according to an aspect of the present invention includes an acquisition unit configured to acquire information indicating detail of an operation on a vehicle from a detection unit mounted on the vehicle; an operation determination unit configured to determine whether a predetermined collaborative operation executable using two or more operating members has been performed on the basis of information acquired by the acquisition unit; and an execution unit configured to execute a registration process of registering an electronic key of the vehicle in the on-vehicle authentication apparatus or an invalidation process of invalidating the electronic key registered in the on-vehicle authentication apparatus in a case that it is determined by the manipulation determination unit that a collaborative operation has been performed.

(2) In the aspect of the above (1), in a case that the manipulation determination unit determines that a first predetermined operation on a first operating element, and a predetermined second manipulation on a second manipulation part which is in a predetermined positional relationship with the first manipulation part have been executed at a predetermined timing, it is determined that the collaborative manipulation has been performed.

(3) In the aspect of the above (2), the first manipulation may be a manipulation on a plurality of first manipulation parts and/or the second manipulation may be a manipulation on a plurality of second manipulation parts.

(4) In the aspect of the above (2), the first manipulation may be a plurality of operations and/or the second manipulation may be a plurality of operations.

(5) In the aspect of the above (2), the first manipulation part may be a part provided in a passenger compartment of the vehicle, and the second manipulation part may be a part provided outside the passenger compartment of the vehicle.

(6) In the aspect of the above (5), the first manipulation may include at least one of a manipulation on a switch for starting the vehicle and a manipulation on an manipulator for controlling traveling of the vehicle, and the second manipulation may include at least one of an opening and closing manipulation on a rear gate of the vehicle and an opening and closing manipulation on a hood.

(7) In the aspect of the above (2), the first manipulation part and the second manipulation part may be provided on opposite sides in a front-rear direction or a width direction of the vehicle.

(8) In the aspect of the above (7), the first manipulation may include at least one of an opening manipulation and a closing manipulation on a rear gate of the vehicle, and the second manipulation may include at least one of an opening manipulation and a closing manipulation on a hood of the vehicle.

(9) In the aspect of the above (7), the first manipulation part may be an outer handle which receives a manipulation of opening the door of the vehicle from the outside, and the second manipulation part may be an outer handle provided on a side in the width direction of the vehicle opposite to a side to which the outer handle as the first manipulation part is attached.

(10) In the aspect of the above (2), a distance between an installation position of the first manipulation part and an installation position of the second manipulation part may be equal to or larger than a predetermined value.

(11) In the aspect of the above (1), a selection unit configured to select any one of a plurality of collaborative manipulations may be further included.

(12) In the aspect of the above (11), the selection unit may select the collaborative manipulation, on the basis of at least one of a vehicle type of the vehicle, a vehicle body number of the vehicle, and a date and a time at which the registration process or the invalidation process is executed.

(13) An authentication method according to an aspect of the present invention includes, using a computer, acquiring information indicating a content of a manipulation on a vehicle from a detection unit mounted on the vehicle; determining whether a predetermined collaborative manipulation executable by two or more manipulators is performed on the basis of acquired information; and executing a registration process of registering an electronic key of the vehicle in an on-vehicle authentication apparatus or an invalidation process of invalidating the electronic key registered in the on-vehicle authentication apparatus in a case that the collaborative manipulation is determined to be performed.

(14) A non-transitory computer-readable storage medium which stores a program according to an aspect of the present invention includes causing a computer to acquire information indicating a content of a manipulation on a vehicle from a detection unit mounted on the vehicle; causing the computer to determine whether a predetermined collaborative manipulation executable by two or more manipulators is performed on the basis of acquired information; and causing the computer to execute a registration process of registering an electronic key of the vehicle in an on-vehicle authentication apparatus or an invalidation process of invalidating the electronic key registered in the on-vehicle authentication apparatus, in a case that the collaborative manipulation is determined to be performed.

According to the aspects (1) to (14), the security of the vehicle can be improved.

BRIEF DESCRIPTION OF THE DRAWINGS

FIG. 4 is a diagram showing an example of contents of address management information.
FIG. 6 is information showing the contents of a collaborative manipulation of a first manipulation part and a second manipulation part having a positional relationship (part 1).
FIG. 7 is information showing the contents of the collaborative manipulation of the first manipulation part and the second manipulation part having a positional relationship (part 2).
FIG. 8 is a diagram showing an example of the contents of selection conditions information.
FIG. 9 is a diagram showing an example of contents of selection condition information.
FIG. 10 is a diagram showing an example of the contents of selection condition information.

DESCRIPTION OF EMBODIMENTS

Embodiments of an on-vehicle authentication apparatus, an authentication method, and a storage medium of the present invention will be described below with reference to the drawings.

[Overall Configuration]

Figure 1:
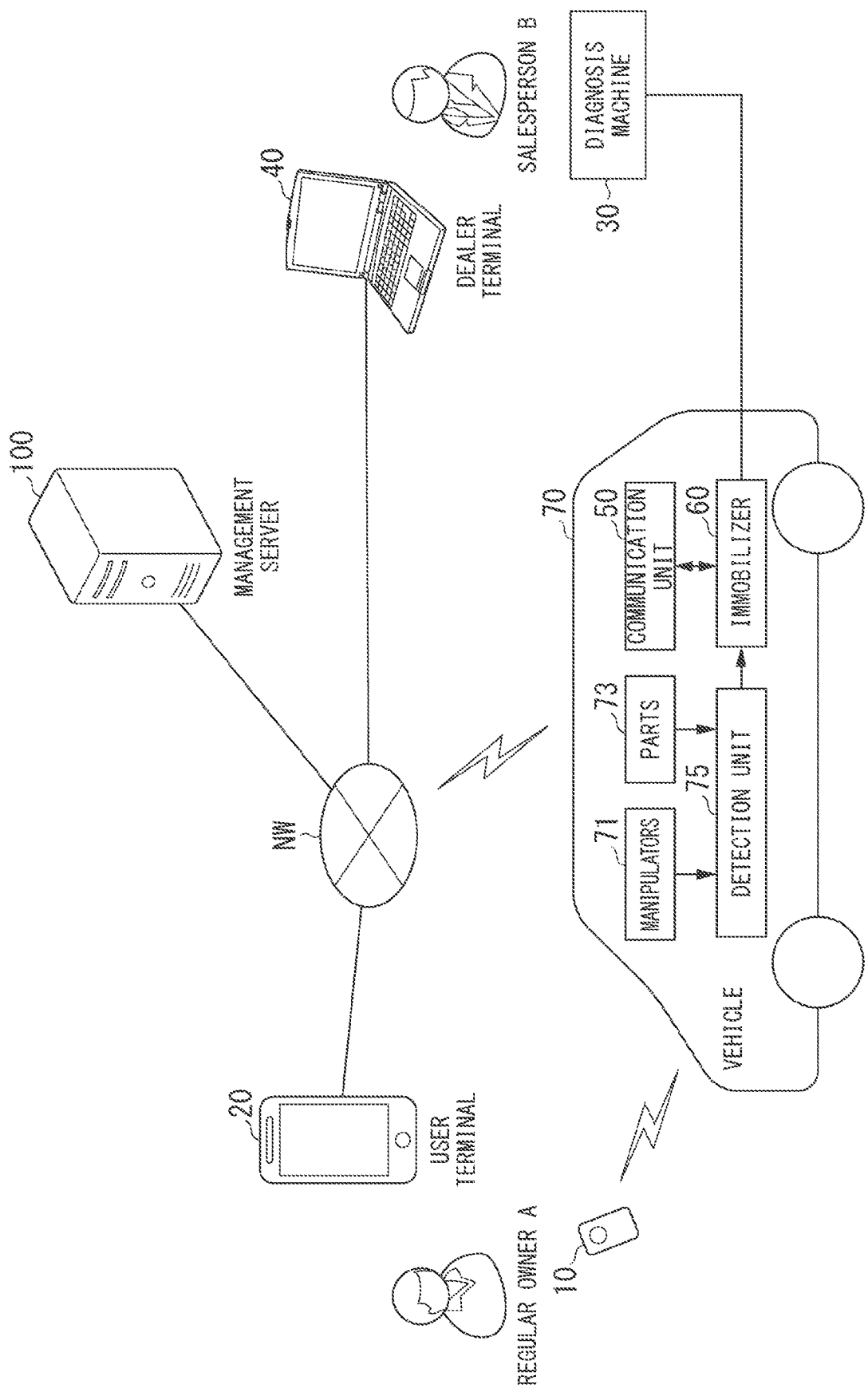
FIG. 1 is a configuration diagram of an electronic key management system according to an embodiment.

FIG. 1 is a configuration diagram of an electronic key management system 1 including a vehicle authentication apparatus according to an embodiment. The electronic key management system 1 includes, for example, an electronic key 10, a user terminal 20, a diagnosis machine 30, a dealer terminal 40, a communication unit 50, an immobilizer 60, and a management server 100. The user terminal 20, the dealer terminal 40, the communication unit 50, and the management server 100 communicate with each other, using a network NW. The network NW may be some or all of, for example, a wide area network (WAN), a local area network (LAN), the Internet, a provider device, a wireless base station, a dedicated line, and the like.

The communication unit 50 and the immobilizer 60 are mounted on the vehicle 70. The immobilizer 60 is an example of an on-vehicle apparatus (that is, an on-vehicle authentication apparatus) that performs an authentication process. The on-vehicle authentication apparatus may be any apparatus other than an immobilizer, as long as it is an on-vehicle apparatus that performs an authentication process.

The vehicle 70 is, for example, a vehicle purchased by a regular owner A. A registration operation and an invalidation operation of the electronic key 10, which will be described below, are performed, for example, at a dealer shop at the time of one of a delivery, an additional registration or a registration cancellation. Each of these processes may be performed at home or the like by the regular owner A. A time of additional registration is the time at which a new electronic key is registered in a case that the electronic key has been lost, or a time at which a new electronic key after a second key or the like is registered. A time of registration cancellation is, for example, the time at which the registration of a lost electronic key is cancelled. Hereinafter, these will be used without distinguishing therebetween. Further, hereinafter, an example in which the registration work or the invalidation work is performed by a salesperson B of the dealer shop will be described.

The electronic key 10 is an electronic key prepared for registration for the vehicle 70. Key information is stored in a storage unit provided in the electronic key 10 itself. The key information is, for example, identification information for identifying the electronic key 10. The electronic key 10 is provided with a predetermined switch. The key information stored in the storage unit of the electronic key 10 is transmitted by operating the switch.

The user terminal 20 is a terminal device used by the regular owner A. The user terminal 20 is, for example, a tablet terminal, a smartphone, a personal digital assistant (PDA), a laptop computer, or the like.

The diagnosis machine 30 diagnoses a failure or the like in the vehicle, for example, in a state of being connected to the immobilizer 60, using a dedicated wired cable. In a case that the diagnosis machine 30 is connected to the immobilizer 60, the diagnosis machine 30 may be connected indirectly or directly via another ECU. In the embodiment, the diagnosis machine 30 is used as a tool for operating in the predetermined mode on the immobilizer 60.

The dealer terminal 40 is a terminal device used by a salesperson B of a dealer shop. The dealer terminal 40 is, for example, a desktop personal computer or a laptop computer installed in a dealer shop, and may be a tablet terminal, a smartphone, a PDA, or the like.

The communication unit 50 is, for example, a wireless communication module for connecting to the network NW via a cellular network or a Wi-Fi network. The communication unit 50 is connected to the immobilizer 60, and outputs information received from an external device such as the management server 100 to the immobilizer 60.

The immobilizer 60 stores the key information of the electronic key registered by the registration process of the electronic key 10 in a storage unit (to be described later), and performs collation of the key information between the immobilizer 60 and the electronic key 10. Specifically, the immobilizer 60 collates the registered key information and the key information received from the electronic key 10, and determines whether the registered key information and the key information coincide with each other. In a case where it is determined that the key information received from the electronic key 10 by the determination processing coincides with the key information held in the storage unit (in a case where the electronic key 10 is authenticated to be regular, that is, in a case where the authentication is successful), the immobilizer 60 permits predetermined operations such as locking or releasing of the door of the vehicle 70 and starting of an engine of the vehicle 70. On the other hand, the authentication is not successful with key information received from the electronic key 10 which is not registered. In this case, the immobilizer 60 does not permit predetermined operations.

Various manipulators 71, various parts 73, and a detection unit 75 are attached to the vehicle 70. The various manipulators 71 are manipulators mounted on the vehicle 70, and include, for example, an ignition switch (an manipulator for starting the vehicle 70), an accelerator pedal, a brake pedal, a rear gate opener (a manipulator which accepts an operation for opening a rear gate), an inner handle (a member provided inside the passenger compartment, and a manipulator which opens a door from the inside of the vehicle 70), an outer handle (a member provided outside the passenger compartment, and a manipulator which opens the door from the outside of the vehicle 70), a manipulator which accepts manipulation for turning on a blinker lever, a head lamp, a hazard lamp, a tail lamp, a fog lamp and the like, and a manipulator which accepts a manipulation for outputting an alarm sound from a siren, a buzzer, a horn or the like, and the like. The parts 73 include, for example, a side door (a door provided on a side surface of the vehicle 70), a rear gate (a door provided on a rear end of the vehicle 70), a hood, and the like. The detection unit 75 detects the contents of operations on the manipulators 71 and the parts 73. The detection unit 75 may be a member connected to the manipulators 71 and the parts 73, and may be a sensor or the like installed around the manipulators 71 and the parts 73 to detect the operations of the manipulators 71 and parts 73 used. The detection unit 75 is connected to the immobilizer 60, and outputs the detection results to the immobilizer 60.

The management server 100 issues an execution key to be input to the diagnosis machine 30 by the salesperson B, in the registration process or the invalidation process of the electronic key 10 to be described below. The execution key is information for obtaining permission which is shifted to the registration mode or the invalidation mode. The registration mode is a mode in which the electronic key 10 is registered in the immobilizer 60 as a dedicated electronic key for the vehicle 70. The invalidation mode is a mode which invalidates the electronic key registered in the immobilizer 60 as a dedicated electronic key for the vehicle 70. The salesperson B of the dealer shop switches the immobilizer 60 to the registration mode, using the execution key, and then performs association between the electronic key 10 and the vehicle 70. The salesperson B of the dealer shop switches the immobilizer 60 to the invalidation mode, using the execution key, and then cancels the association between the electronic key 10 and the vehicle 70.

[Diagnosis Machine 30]

Figure 2:
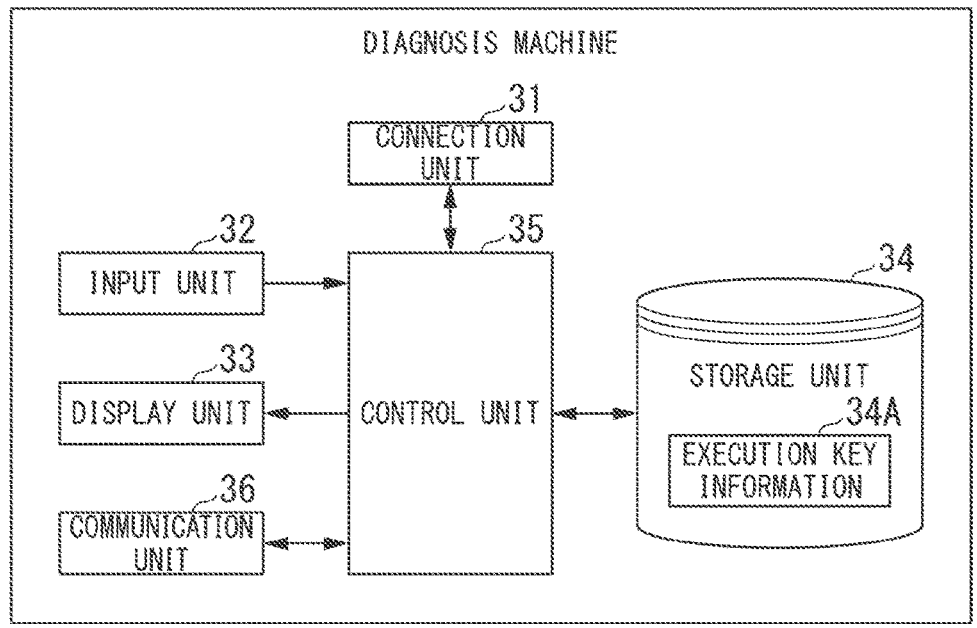
FIG. 2 is a configuration diagram of a diagnosis machine.

FIG. 2 is a configuration diagram of the diagnosis machine 30. As illustrated in FIG. 2, the diagnosis machine 30 includes a connection unit 31, an input unit 32, a display unit 33, a storage unit 34, a control unit 35, and a communication unit 36. The connection unit 31 is a connector to which a wired cable is connected. The connection unit 31 is connected to the immobilizer 60 via a wired cable. The input unit 32 is various keys, buttons, and the like. The display unit 33 is a liquid crystal display (LCD) or the like. The storage unit 34 is realized by a random access memory (RAM), a read only memory (ROM), a flash memory, or the like. The control unit 35 communicates with the immobilizer 60, for example, on the basis of the information that is input by the salesperson B using the input unit 32, and executes a predetermined process on the basis of the information received from the immobilizer 60. The communication unit 36 is, for example, a wireless communication module (communication device) for connecting to the network NW via a cellular network or a Wi-Fi network.

[Management Server 100]

Figure 3:
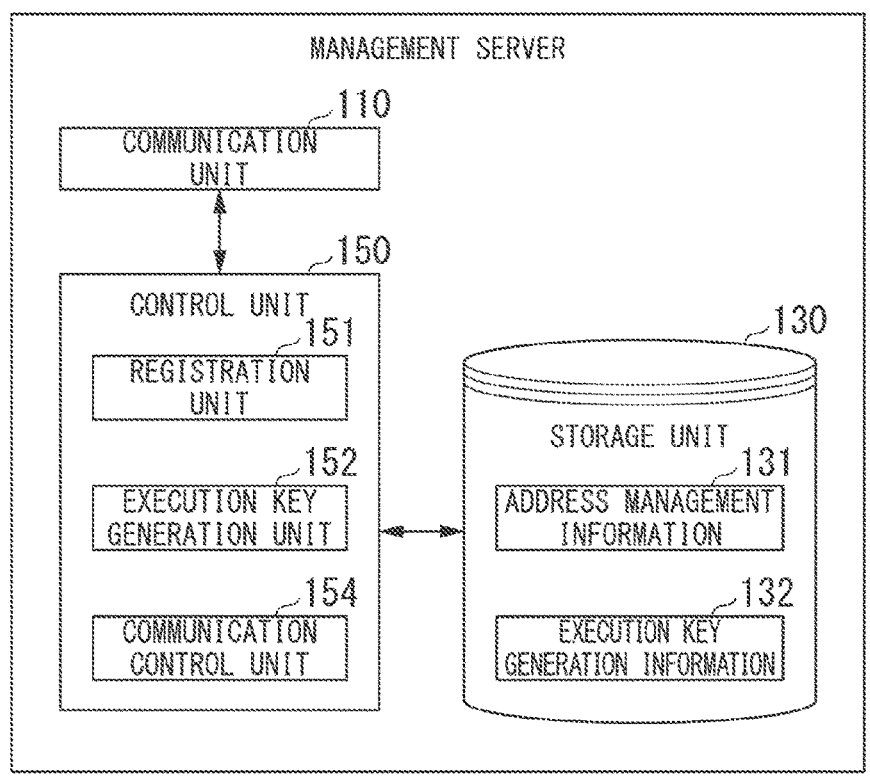
FIG. 3 is a configuration diagram of a management server.

Before the immobilizer 60, the management server 100 will be described first. FIG. 3 is a configuration diagram of the management server 100. As illustrated in FIG. 3, the management server 100 includes a communication unit 110, a storage unit 130, and a control unit 150. The communication unit 110 includes, for example, a communication interface such as a network interface card (NIC). The storage unit 130 is a flash memory such as a RAM, a ROM and a solid state drive (SSD), a hard disk drive (HDD), or the like. The storage unit 130 stores, for example, information such as address management information 131 and execution key generation information 132. The execution key generation information 132 is information necessary for generating the execution key. For example, the execution key generation information 132 includes an arithmetic expression, and a program or the like for deriving the execution key on the basis of the input information.

FIG. 4 is a diagram showing an example of the contents of the address management information 131. As illustrated in FIG. 4, the address management information 131 is, for example, information obtained by associating a dealer email address, and a user email address, and an execution key with a vehicle body number. The vehicle body number is identification information identifying each vehicle 70, for example, a number displayed on a number plate attached to (or to be attached to) the vehicle 70. The dealer mail address is a mail address that can receive a mail using the dealer terminal 40. The user mail address is a mail address that can receive a mail using the user terminal 20. The execution key is, for example, an execution key generated by the management server 100 on the basis of a corresponding vehicle body number or the like.

The control unit 150 includes, for example, a registration unit 151, an execution key generation unit 152, and a communication control unit 154. These components are realized, for example, by execution of a program (software) by a hardware processor such as a central processing unit (CPU). Some or all of the functional units of the control unit 150 to be described below may be realized by hardware such as a large scale integration (LSI), an application specific integrated circuit (ASIC), and a field-programmable gate array (FPGA), and may be realized by cooperation between software and hardware. The program may be stored in storage device such as a hard disk drive (HDD) or a flash memory (a storage device including a non-transitory storage medium) in advance. Further, the program may be stored in a removable storage medium such as a DVD and a CD-ROM, and may be installed on the execution key generation information 132 and the like of the storage unit 130 in a case that the storage medium (non-transitory storage medium) is mounted on the drive device.

The registration unit 151 stores information obtained by associating the dealer mail address received from the dealer terminal 40 and the user mail address received from the user terminal 20 with the vehicle body number received from the dealer terminal 40 as part of the address management information 131, in the storage unit 130. The mail address associated with the vehicle body number in the address management information 131 may be one of a dealer mail address or a user mail address.

The execution key generation unit 152 generates the execution key, using the execution key generation information 132, for example, in response to an execution request from the immobilizer 60. For example, the execution key generation information 132 generates the execution key K, on the basis of fixed information, such as a vehicle body number registered in the address management information 131 or variable information such as the date and time information of the registration date. The execution key generation unit 152 stores the generated execution key K in the storage unit 130 in association with the corresponding vehicle body number.

The communication control unit 154 transmits the execution key K generated by the execution key generation unit 152 to the immobilizer 60 that has transmitted the execution request. Hereinafter, the execution key K transmitted to the immobilizer 60 will be referred to as an execution key Ki. The communication control unit 154 may transmit the execution key K generated by the execution key generation unit 152 to the diagnosis machine 30 that has transmitted the execution request.

Hereinafter, the execution key K transmitted to the diagnosis machine 30 is referred to as an execution key Kd. The execution keys Ki and Kd are the same information as the execution key K.

The communication control unit 154 transmits the execution key K generated by the execution key generation unit 152 to at least one of the dealer terminal 40 and the user terminal 20. Hereinafter, the execution key K transmitted to at least one of the dealer terminal 40 and the user terminal 20 is referred to as an execution key Kt. The execution key Kt is the same information as the execution key K. The dealer terminal 40 or the user terminal 20 displays information on the received execution key Kt (for example, information for identifying the execution key Kt or a part or all of the execution key K) on its display unit. The execution key which is referred to by an operator using the display unit and input to the input unit 32 by the manipulator and which is input to the immobilizer 60 from the diagnosis machine 30 is referred to as an execution key Kt (m) below.

[Immobilizer 60]

Figure 5:
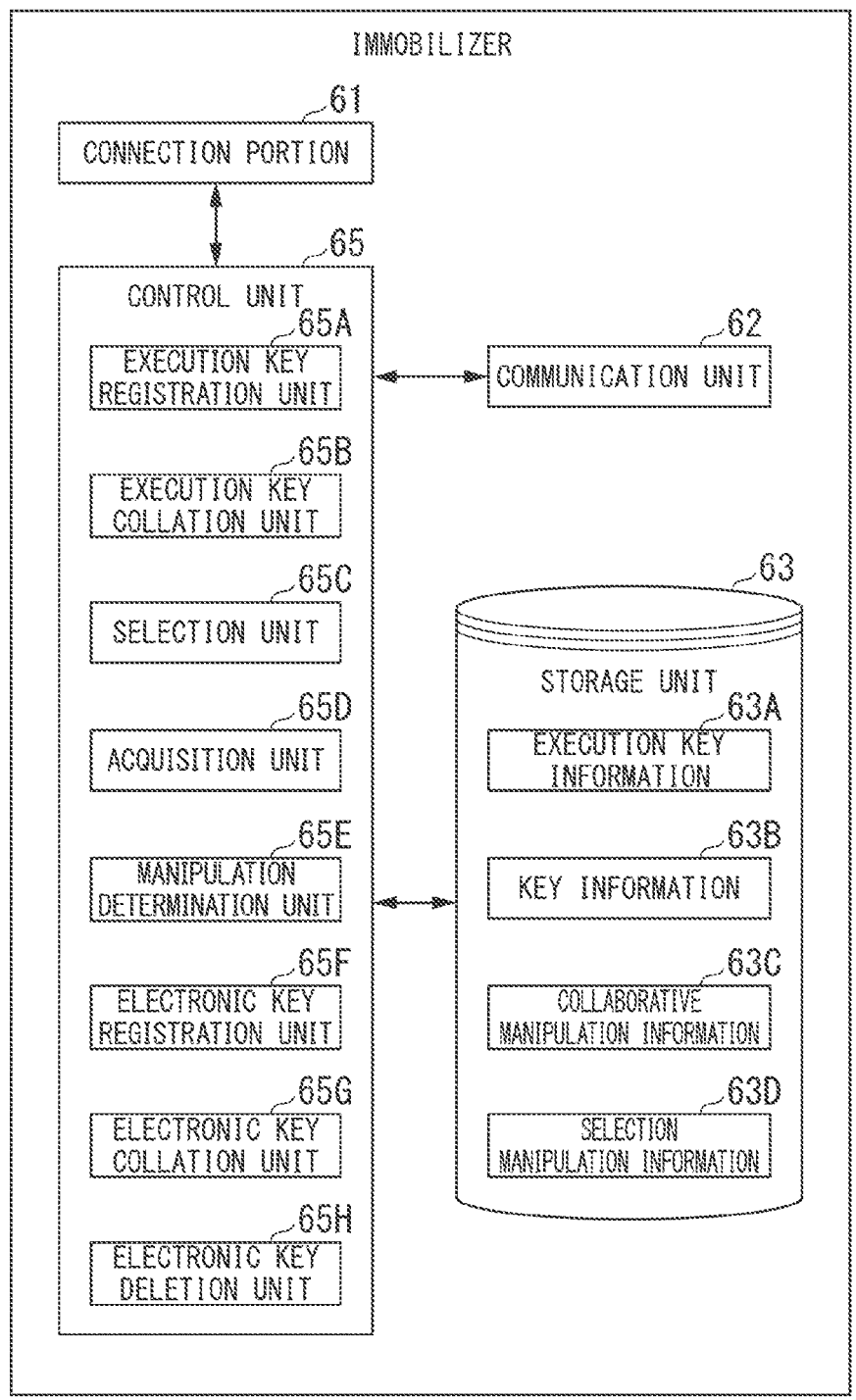
FIG. 5 is a configuration diagram of an immobilizer.

FIG. 5 is a configuration diagram of the immobilizer 60. As illustrated in FIG. 5, the immobilizer 60 includes a connection unit 61, a communication unit 62, a storage unit 63, and a control unit 65. The connection unit 61 is a connector to which a wired cable is connected. The connection unit 61 is connected to the diagnosis machine 30 and the communication unit 50 via a wired cable. The communication unit 62 is communicably connected to the communication unit 50, for example, by wireless communication. The storage unit 63 is realized by a RAM, a ROM, a flash memory, or the like.

The storage unit 63 stores, for example, information such as execution key information 63A, key information 63B, collaborative manipulation information 63C, and selection condition information 63D. The execution key information 63A is information indicating the execution key Ki received from the management server 100. The key information 63B is identification information assigned to the electronic key 10 registered as a dedicated electronic key to the vehicle 70 (that is, the immobilizer 60) in the registration mode. The key information 63B may include a plurality of pieces of key information.

The collaborative manipulation information 63C is information indicating the contents of a predetermined collaborative manipulation. The predetermined collaborative manipulation is one of the conditions for the immobilizer 60 to execute the registration process or the invalidation process. The predetermined collaborative manipulation is a manipulation executable by two or more manipulators, and is a combination of a first manipulation on the first manipulation part and a second manipulation on the second manipulation part. The first manipulation part and the second manipulation part are parts having a predetermined positional relationship (including a manipulator, the same applies hereinafter).

For example, the first manipulation part and the second manipulation part have a positional relationship (first type) such as a part provided in the passenger compartment and a part provided outside the passenger compartment. The first manipulation part and the second manipulation part may have a positional relationship (part 2) such as a part provided on an opposite side (one end or the other end) with respect to a front-rear direction or a width direction of the vehicle 70. The front-rear direction of the vehicle 70 is a direction indicating forward and rearward in a traveling direction of the vehicle 70.

The first manipulation part and the second manipulation part may have a positional relationship (part 3) in which the distance therebetween is equal to or greater than a predetermined value. In the positional relationship (part 3), the distance between the installation position of the first manipulation part and the installation position of the second manipulation part may be a straight-line distance, or may be a length of a space over which a human body can extend. For example, even if a distance is equal to or less than a predetermined value with a straight-line distance, in a case that a seat or the like is present between the first manipulation part and the second manipulation part, in some cases, the distance of the space in which the human body can extend to avoid the seat or the like may be equal to or greater than a predetermined value. This case also corresponds to the positional relationship (part 3). The first manipulation part and the second manipulation part have at least one positional relationship among the positional relationships (1) to (3).

FIGS. 6 and 7 are diagrams showing an example of the contents of the collaborative manipulation information 63C. The collaborative manipulation information 63C stored in the storage unit 63 may be one of the collaborative manipulation information 63C illustrated in FIGS. 6 and 7, or both of them. FIG. 6 is information that illustrates an example of the contents of the collaborative manipulation performed by the first manipulation part and the second manipulation part having the positional relationship (part 1). FIG. 7 is information that illustrates an example of the contents of the collaborative manipulation performed by the first manipulation part and the second manipulation part having the positional relationship (part 2). As illustrated in FIGS. 6 and 7, the collaborative manipulation information 63C is information in which the first manipulation part, the first manipulation, the second manipulation part, and the second manipulation are associated with the collaborative manipulation ID. The collaborative manipulation ID is identification information for identifying each collaborative manipulation. In FIG. 6, the first manipulation part is a part provided in the passenger compartment, and the second manipulation part is a part provided outside the passenger compartment. In FIG. 7, the first manipulation part is a part provided on the front side of the vehicle 70, and the second manipulation part is a part provided on the rear side of the vehicle 70.

The selection condition information 63D is a condition for selecting one among a plurality of previously prepared collaborative manipulations. FIGS. 8 to 10 are diagrams showing an example of the contents of the selection condition information 63D. The selection condition information 63D stored in the storage unit 63 may be at least one of the pieces of selection condition information 63D illustrated in FIGS. 8 to 10. As illustrated in FIG. 8, the selection condition information 63D may be, for example, information in which the collaborative manipulation ID is associated with a vehicle type. The vehicle type is information indicating the type of the vehicle, and includes, for example, a light car, a passenger car, a minivan, a sports utility vehicle (SUV), and the like. As illustrated in FIG. 9, the selection condition information 63D may be information in which a collaborative manipulation ID is associated with the vehicle body number. As illustrated in FIG. 10, the selection condition information 63D may be information in which the collaborative manipulation ID is associated with the date and time. The date and time is a date and time at which it is determined whether the collaborative manipulation has been performed by a manipulation determination unit 65E to be described later.

The control unit 65 includes, for example, an execution key registration unit 65A, an execution key collation unit 65B, a selection unit 65C, an acquisition unit 65D, a manipulation determination unit 65E, an electronic key registration unit 65F, an electronic key collation unit 65G and an electronic key deletion unit 65H. These configurations are realized, for example, in a case that a hardware processor such as a CPU executes a program (software).

In a case that the execution request of the registration mode is input from the diagnosis machine 30 or in a case that the execution request of the invalidation mode is input from the diagnosis machine 30, the execution key registration unit 65A transmits the input information to the management server 100. In a case that receiving the execution key Ki from the management server 100, the execution key registration unit 65A stores the execution key Ki in the storage unit 63 as the execution key information 63A.

The execution key collation unit 65B collates the execution key Kt (m) input to the immobilizer 60 from the diagnosis machine 30 with the execution key Ki that is the execution key information 63A stored in the storage unit 63. The execution key collation unit 65B determines whether the execution key Kt (m) and the execution key Ki coincide with each other, and in a case that both coincide with each other, the execution key collation unit 65B authenticates the execution key Kt (m) input to the immobilizer 60 from the diagnosis machine 30 as a regular one (that is, determines that the authentication is successful). On the other hand, in a case that it is determined by the collation that both do not coincide with each other, the execution key collation unit 65B does not authenticate the execution key Kt (m) input to the immobilizer 60 from the diagnosis machine 30 as a regular one (that is, determines that the authentication is not successful). The fact that the keys coincide with each other may include various meanings in which correct information can be obtained in a case that the information encrypted using one key is decrypted using the other key, in addition to coincidence or partial coincidence of information indicated by keys. The same applies to the following.

The execution key collation unit 65B may execute the above-described authentication process, by collating the execution key Kt (m) that is input to the immobilizer 60 from the diagnosis machine 30 with the execution key Kd.

The execution key collation unit 65B may determine whether the execution key Kt (m) that is input to the immobilizer 60 from the diagnosis machine 30 is a regular one by executing a predetermined program. In the latter case, as the execution key K, a hash value, a random number, or the like generated on the basis of the date, the vehicle body number, or the like can be used.

The selection unit 65C selects one of a plurality of collaborative manipulations. For example, the selection unit 65C may select a collaborative manipulation on the basis of a predetermined criterion (the vehicle type of the vehicle 70, the vehicle body number of the vehicle 70, the date and time in a case that it is determined whether the collaborative manipulation has been performed, and the like). As for the criterion, one of a plurality of criteria may be set by the selection unit 65C, or may be selected by the salesperson B. In a case that one using the vehicle type of the vehicle 70 is set as a criterion, the selection unit 65C refers to the selection condition information 63D to acquire the collaborative manipulation ID associated with the vehicle type of the vehicle 70. In order to be different from the previously selected collaborative manipulation, the selection unit 65C may select the collaborative manipulation on the basis of a criterion different from the last time or the selection unit 65C may cause the salesperson B to select the collaborative manipulation on the basis of a criterion different from the last time. In this way, by selecting one of a plurality of collaborative manipulations or by selecting a different one from the previously selected collaborative manipulation, it takes time and labor to check for the contents of the collaborative operation, and time and labor to look for the first manipulation part and the second manipulation part every time. As a result, the willingness of a malicious person may be lost, and as a result, the security of the vehicle can be improved.

The acquisition unit 65D acquires information indicating the contents of the manipulation on the vehicle 70 from the detection unit 75 mounted on the vehicle 70, using the connection unit 61, and outputs the acquired information to the manipulation determination unit 65E. Manipulations on the vehicle 70 include, for example, manipulation on the manipulator 71 mounted on the vehicle 70 and manipulation on the parts 73 attached to the vehicle 70.

The manipulation determination unit 65E determines whether a predetermined collaborative manipulation has been performed on the basis of information acquired by the acquisition unit 65D. In a case that the first manipulation on the first manipulation part and the second manipulation on the second manipulation part are executed at the predetermined timing, the manipulation determination unit 65E determines that the collaborative manipulation is performed. The predetermined timing includes, for example, that a time difference between the timing at which the first manipulation is detected and the timing at which the second manipulation is detected is within a predetermined time. The predetermined time is determined depending on the contents of the collaborative manipulation, which is a length shorter than the time required for the case of performing the collaborative manipulation by one person and sufficient for manipulating with two or more people. The predetermined time may be determined depending on the positional relationship between the first manipulation part and the second manipulation part, or the number of times of operation of the first operation or the second operation which are a plurality of times.

The electronic key registration unit 65F is an execution unit that shifts to the registration mode to execute the registration process. In a case that the predetermined execution condition is satisfied, the electronic key registration unit 65F executes the registration process. The execution condition may be, for example, determining that the execution key Kt (m) is authenticated as a regular one by the execution key collation unit 65B and the collaborative manipulation is performed by the manipulation determination unit 65E. The execution condition may be only for the determination performed by the manipulation determination unit 65E. For example, the electronic key registration unit 65D may perform the registration process if it is determined that the collaborative manipulation is performed by the manipulation determination unit 65E without performing the authentication process based on the execution key.

For example, in a case that the execution key Kt (m) is authenticated as a regular one by the execution key collation unit 65B, the electronic key registration unit 65F executes the registration mode in accordance with the execution request of the registration mode from the diagnosis machine 30. The execution request of the registration mode may be performed before or after the authentication. In a case that it is determined that a collaborative manipulation is performed by the manipulation determination unit 65E while the registration mode is being executed, the electronic key registration unit 65F stores the key information received from the electronic key 10 in the storage unit 63 as the key information 63B, and ends the registration mode. In a case that the execution condition is satisfied, the electronic key registration unit 65F may execute the registration mode in accordance with the execution request of the registration mode from the diagnosis machine 30.

In a case that receiving the key information from the electronic key 10, the electronic key collation unit 65G collates the received key information with the key information 63B of the storage unit 63. The electronic key collation unit 65G determines whether both coincide with each other by collation, and if they coincide with each other, the electronic key collation unit 65G authenticates the key information received from the electronic key 10 as a regular one. In the case where the key information received from the electronic key 10 is authenticated as a regular one, the electronic key collation unit 65G permits predetermined operations such as locking or releasing of the door of the vehicle 70 and starting of the engine of the vehicle 70. On the other hand, in a case where the both do not coincide with each other due to the collation, since the electronic key collation unit 65G does not authorize the key information received from the electronic key 10 as a regular one, the electronic key collation unit 65G does not permit the predetermined operations.

The electronic key deletion unit 65H is an execution unit that shifts to the invalidation mode to execute the invalidation process. In a case that the predetermined execution condition is satisfied, the electronic key deletion unit 65H executes the invalidation process. In a case that the execution key Kt (m) is authenticated as a regular one by the execution key collation unit 65B, the electronic key deletion unit 65H executes the invalidation mode in response to the invalidation request of the registration mode from the diagnosis machine 30. The execution request of the invalidation mode may be performed before or after the authentication. In a case that it is determined that the collaborative manipulation is performed by the manipulation determination unit 65E during the execution of the invalidation mode, the electronic key deletion unit 65H determines whether the key information received from the electronic key 10 is stored in the storage unit 63 as key information 63B. In a case that the key information received from the electronic key 10 is stored in the storage unit 63 as the key information 63B, the electronic key deletion unit 65H deletes the key information received from the electronic key 10 from the storage unit 63, and ends the invalidation mode. In a case that the predetermined execution condition is satisfied, the electronic key deletion unit 65H may execute the invalidation mode in response to the invalidation request of the registration mode from the diagnosis machine 30.

[Sequence Diagram]

Figure 11:
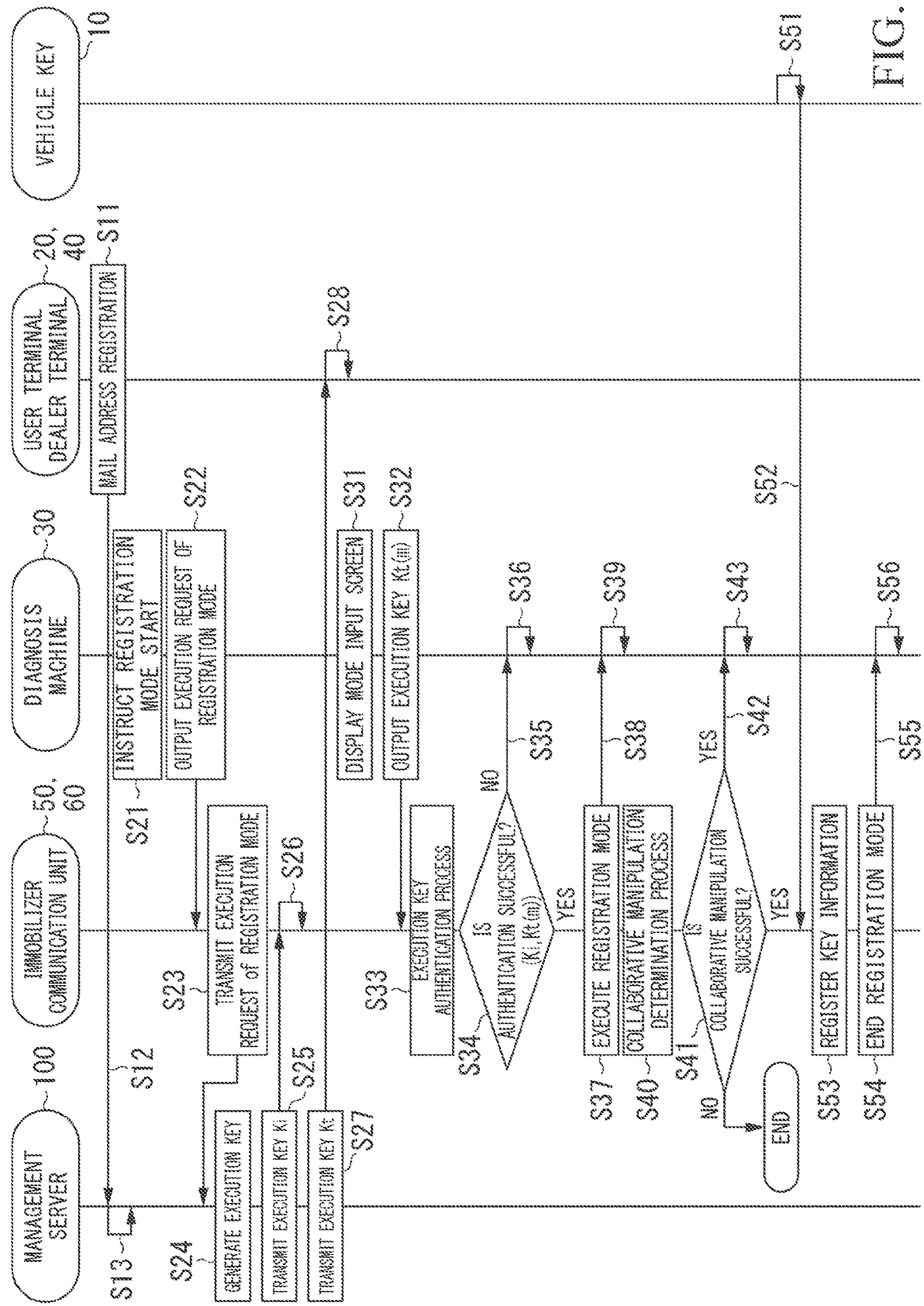
FIG. 11 is a sequence diagram showing a flow of processing of the electronic key management system.

FIG. 11 is a sequence diagram showing a flow of the process performed by the electronic key management system 1. Hereinafter, a case where the registration mode is executed will be described. First, the salesperson B manipulates the dealer terminal 40, and performs an operation of registering the dealer mail address in the management server 100 (step S11). As a result, the dealer terminal 40 transmits the input dealer mail address to the management server 100 (step S12). The management server 100 stores the received dealer mail address in the storage unit 130 (step S13). Similarly to the regular owner A, the user mail address may be registered in the management server 100 in advance by transmitting the user mail address from the user terminal 20 to the management server 100.

Next, the salesperson B manipulates the diagnosis machine 30 to instruct the execution start of the registration mode (step S21). Here, the salesperson B inputs the vehicle body number. Upon receiving an instruction of the execution start of the registration mode, the diagnosis machine 30 outputs an execution request of the registration mode together with the vehicle body number to the immobilizer 60 (step S22). In a case that the execution request of the registration mode is input, the immobilizer 60 transmits the execution request together with the vehicle body number to the management server 100 via the communication unit 50 (step S23). Upon receiving the execution request of the registration mode, the management server 100 generates the execution key K on the basis of the vehicle body number, the date and time information, and the like (step S24).

The management server 100 transmits the execution key Ki, which is the execution key K generated in step S24, to the immobilizer 60 via the communication unit 50 (step S25). The immobilizer 60 stores the received execution key Ki in the storage unit 63 as execution key information 63A (step S26). The management server 100 transmits the execution key Kt that is the execution key K generated in step S24 to the dealer terminal 40 (step S27). The dealer terminal 40 causes the display unit of the dealer terminal 40 to display information on the received execution key Kt (step S28).

Next, the diagnosis machine 30 causes the display unit 33 to display an input screen (hereinafter referred to as an execution key input screen) for accepting the input of the execution key (step S31). An input column for information other than the execution key and necessary for authentication may be provided on the execution key input screen. The diagnosis machine 30 outputs the execution key Kt (m), which is input to the input unit 32 by the manipulator, to the immobilizer 60 (step S32).

The immobilizer 60 performs an execution key authentication process of collating the execution key Kt (m) input from the diagnosis machine 30 with the execution key Ki which is the execution key information 63A stored in step S26 (step S33). Next, it is determined whether both coincide with each other in the execution key authentication process (step S34). If it is not determined that both coincide with each other, the immobilizer 60 outputs information indicating that the authentication has failed to the diagnosis machine 30 (step S35), and the diagnosis machine 30 causes the display unit 33 to display a screen showing that authentication has failed, on the basis of the input information (step S36).

On the other hand, if it is determined that the both coincide with each other in step S34, the immobilizer 60 executes the registration mode (step S37), and outputs information indicating that the registration mode is being executed (or the authentication of the execution key is successful) to the diagnosis machine 30 (step S38). The diagnosis machine 30 causes the display unit 33 to display a screen showing that the registration mode is being executed (or the authentication of the execution key is successful) on the basis of the input information (step S39). Here, the immobilizer 60 may cause the diagnosis machine 30 to display that the electronic key 10 cannot be registered unless a collaborative manipulation is executed, together with the aforementioned contents.

Next, the immobilizer 60 executes the collaborative manipulation determination process (step S40). The collaborative manipulation determination process will be described below in detail. Next, the immobilizer 60 determines whether a collaborative manipulation is performed in the collaborative manipulation determination process (step S41). If it is determined that the collaborative manipulation is performed, the immobilizer 60 outputs information indicating that registration of the electronic key 10 is possible to the diagnosis machine 30 (step S42). The diagnosis machine 30 causes the display unit 33 to display a screen indicating that registration of the electronic key 10 is possible, on the basis of the input information (step S43). On the other hand, if it is determined that no collaborative manipulation is performed in step S41, the immobilizer 60 ends the process.

In a case that confirming the screen displayed in step S43, the salesperson B manipulates the switch of the electronic key 10 (step S51). In response to the manipulation of the salesperson B, the electronic key 10 transmits the key information held by itself (step S52). Upon receipt of the key information from the electronic key 10, the immobilizer 60 stores the received key information as the key information 63B in the storage unit 63 (step S53), and ends the registration mode (step S54). Next, the immobilizer 60 transmits information indicating that the key information is registered to the diagnosis machine 30 (step S55), and the diagnosis machine 30 causes the display unit 33 to display the received information (step S56).

Even in a case that executing the invalidation mode, the same process as the above-described process is executed. For example, in a case that the execution start of the invalidation mode is instructed by the salesperson B in step S21, an execution key for executing the invalidation mode is generated, and the same process as in the case of executing the registration mode is executed. The immobilizer 60 can delete the key information of the electronic key 10 from the registration of the dedicated electronic key, by deleting the key information received from the electronic key 10 during execution of the invalidation mode from the storage unit 63.

Although the example in which the collaborative manipulation determination process (steps S40 to S43) is executed after the authentication process of the execution key (steps S33 to S36) has been described, this order may be reversed.

In the aforementioned sequence, the example in which the diagnosis machine 30 transmits an execution request via the immobilizer 60, but the dealer terminal 40 may directly transmit the execution request to the management server 100 (case 1). It is determined whether the communication unit 50 is broken or the communication environment is poor. In a case that it is determined that the communication unit 50 is broken or the communication environment is poor, the diagnosis machine 30 may directly transmit the execution request to the management server 100 (case 2). In the case of case 1, the management server 100 transmits the execution key Kt to the dealer terminal 40. The immobilizer 60 may execute the execution key authentication process by collating the execution key Kt (m) that is input from the diagnosis machine with the execution key Ki. In the case of case 2, the management server 100 transmits the execution key Kd to the diagnosis machine 30. The immobilizer 60 may execute the execution key authentication process by collating the execution key Kt (m) that is input from the diagnosis machine 30 with the execution key Kd.

Even in a case that the execution key Kt (m) is not authenticated as a regular one by the execution key collation unit 65B, in a case where it is determined that the collaborative manipulation is performed by the manipulation determination unit 65E, the electronic key registration unit 65F or the electronic key deletion unit 65H may perform the registration process. By doing so, for example, even in the case where the registration mode or the like is requested in a situation in which the vehicle 70 cannot move from a place with poor communication environment with the network such as an underground parking lot or the like, in a case that it is determined that the collaborative manipulation is performed from the manipulation determination unit 65E, registration process and the like can be executed.

Figure 12:
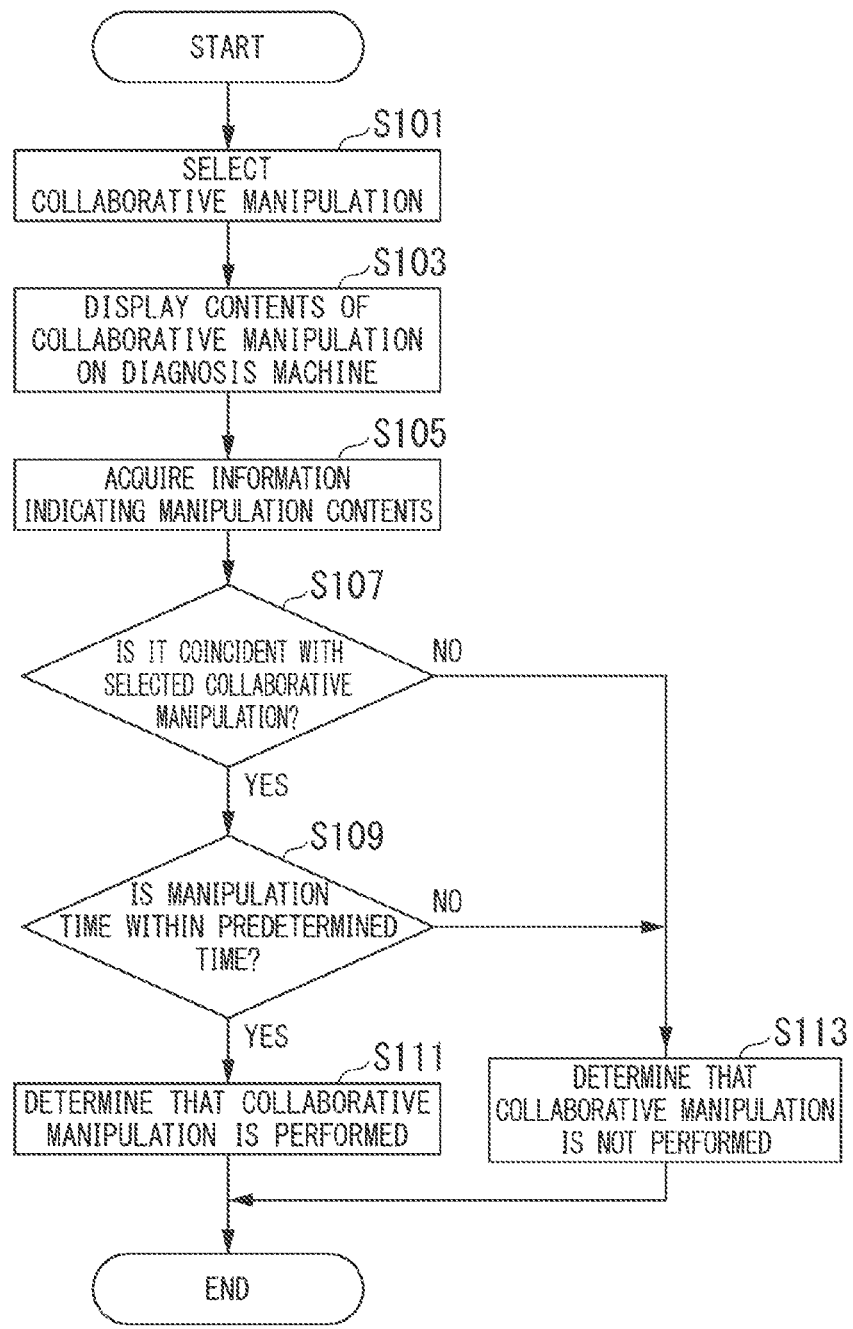
FIG. 12 is an example showing a collaborative manipulation determination process will be described.

Next, an example of the collaborative manipulation determination process will be described with reference to FIG. 12. FIG. 12 is a flowchart showing an example of the flow of the collaborative manipulation determination process. First, the selection unit 65C selects one collaborative manipulation associated with the criterion set from the plurality of collaborative manipulations with reference to the selection condition information 63D (step S101). Subsequently, the selection unit 65C outputs information indicating the contents of the selected collaborative manipulation to the diagnosis machine 30, and displays the information on the display unit 33 (step S103). Further, the salesperson B executes the collaborative manipulation displayed on the display unit 33 with two or more people.

The acquisition unit 65D acquires information indicating the contents of the manipulation on the vehicle 70 from the detection unit 75 mounted on the vehicle 70 (step S105). Next, the manipulation determination unit 65E determines whether the manipulation contents acquired by the acquisition unit 65D coincide with the collaborative manipulation selected by the selection unit 65C, with reference to the collaborative manipulation information 63C (step S107). In a case that the manipulation contents acquired by the acquisition unit 65D coincide with the collaborative manipulation selected by the selection unit 65C, the manipulation determination unit 65E determines whether the manipulation time of the manipulation acquired by the detection unit 75 is within a predetermined time, on the basis of information detected by the acquisition unit 65D (step S109). The manipulation time is the time from the start time of the first manipulation to the start time of the last manipulation among the plurality of manipulations detected by the detection unit 75.

In a case that the manipulation time of the manipulation detected by the detection unit 75 is within a predetermined time, the manipulation determination unit 65E determines that a collaborative manipulation is performed (step S111). On the other hand, in a case that the manipulation contents acquired by the acquisition unit 65D in step S107 do not coincide with the collaborative manipulation selected by the selection unit 65C, and in a case that the manipulation time of the manipulation detected by the detection unit 75 in step S109 is not within a predetermined time, the manipulation determination unit 65E determines that no collaborative manipulation is performed (step S113).

In step S103 of the flowchart of FIG. 12, although it is illustrated that the selection unit 65C outputs information indicating the contents of the selected collaborative manipulation to the diagnosis machine 30, but the present invention is not limited thereto. For example, the selection unit 65C may transmit information indicating the contents of the selected collaborative manipulation to the user terminal 20 or the dealer terminal 40, and may display information on the display unit of the user terminal 20 or the dealer terminal 40, instead of the process of transmitting the information indicating the contents of the selected collaborative manipulation to the diagnosis machine 30 using the communication unit 62. The selection unit 65C may not transmit the information indicating the contents of the selected collaborative manipulation to the immobilizer 60 or any terminal. In the latter case, a document or mail describing the contents of the collaborative manipulation may be provided to the regular owner A or the like, for example, at the time of purchase of the vehicle 70 or the like. By doing this, for example, even if a plurality of malicious persons who used the immobilizer cutter tries to steal, they do not know the contents of the collaborative manipulation. Therefore, since a collaborative manipulation cannot be performed, and it is not possible to cause the immobilizer 60 to execute the registration process and the invalidation process, it is possible to doubly prevent theft.

Figure 13:
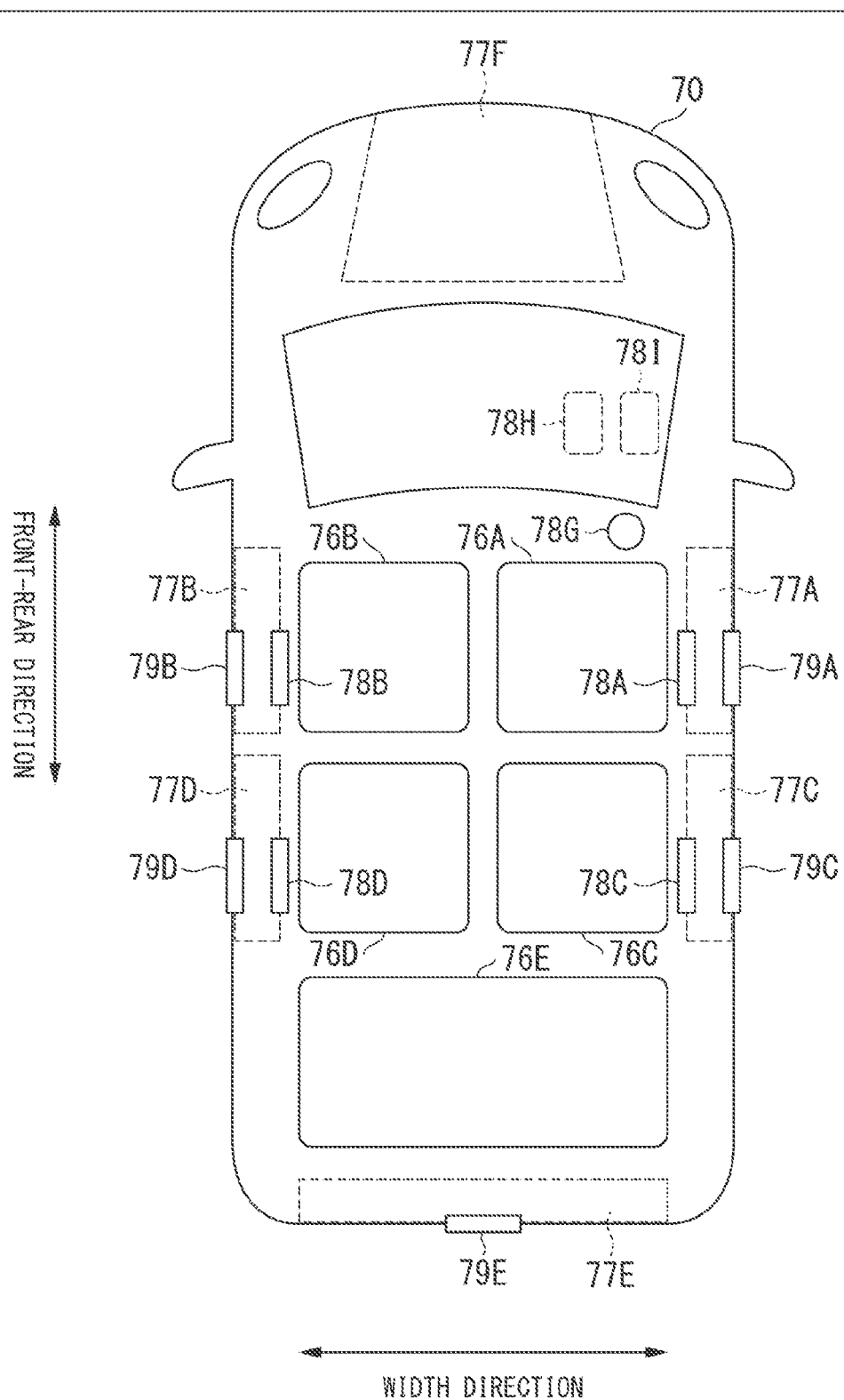
FIG. 13 is a diagram of an example of a vehicle as seen from above.

Next, a specific example of the collaborative manipulation will be described with reference to FIG. 13. FIG. 13 is a view of an example of the vehicle 70 as viewed from above. As illustrated in the drawing, the vehicle 70 includes, for example, seats 76A to 76D and a trunk room 76E in the passenger compartment. A side door 77A is installed at a position adjacent to the seat 76A, a side door 77B is installed at a position adjacent to the seat 76B, a side door 77C is installed at a position adjacent to the seat 76C, a side door 77D is installed at a position adjacent to the seat 76D, and a rear gate 77E is installed at a position adjacent to the trunk room 76E. A bonnet 77F is attached to the front of the vehicle 70.

For example, inner handles 78A to 78D of the side doors 77A to 77D, an inner handle 78E of the rear gate 77E, an ignition switch 78G, a brake pedal 78H, an accelerator pedal 78I, and the like are provided inside the passenger compartment 70. For example, outer handles 79A to 79D of the side doors 77A to 77D, an outer handle 79E of the rear gate 77E, and the like are provided outside the passenger compartment of the vehicle 70.

The collaborative manipulations (1) and (2) described below are collaborative manipulations with respect to the first manipulation part and the second manipulation part associated with the positional relationship (part 1) and the positional relationship (part 3). The collaborative manipulation (1) is, for example, a combination of the manipulation of pushing the ignition switch 78G in the passenger compartment and the manipulation of closing the rear gate 77E outside the passenger compartment. The collaborative manipulation (2) is, for example, a combination of the manipulation of depressing the accelerator pedal 78I in the passenger compartment and the manipulation of closing the bonnet 77F outside the passenger compartment.

Collaborative manipulations (3) and (4) to be described below are collaborative manipulations with respect to the first manipulation part and the second manipulation part associated with the positional relationship (part 2) and the positional relationship (part 3). The collaborative manipulation (3) is a combination of the manipulation of manipulating the first manipulation part, which is one of the outer handles 79A to 79D, to open one of the side doors 77A to 77D from the outside of the passenger compartment, and the manipulation of opening one of the side doors 77A to 77D from the outside of the passenger compartment, using one of the side doors 77A to 77D to which one of the outer handles 79A to 79D as the first manipulation part are attached, and the outer handle 79A to 79D attached to the side door on the opposite side in the width direction of the vehicle 70. For example, the collaborative manipulation (3) is a combination of the manipulation of manipulating the outer handle 79A to open the side door 77A from outside the passenger compartment, and the manipulation of opening the side door 77B or 77D from the outside of the passenger compartment, using the outer handle 79B or 79D. The collaborative manipulation (3) may be manipulation of the inner handles 78A to 78D provided on the opposite side in the width direction or the front-rear direction of the vehicle 70. The collaborative manipulation (4) is a combination of the manipulation of closing the bonnet 77F provided on the opposite side in the front-rear direction of the vehicle 70 and the manipulation of closing the rear gate 77E.

In the aforementioned collaborative manipulation (1) to (4), it is extremely difficult for one person to perform these manipulations at the same timing.

The manipulation of pushing the ignition switch 78G and the manipulation of manipulating the outer handle 79A of the seat 76A to open the side door 77A are the manipulations associated with the positional relationship (part 1), but in a case that the window of the side door 77A is opened, there is a possibility of being manipulated by a person seated in the seat 76A at the same timing. As the collaborative manipulation, it is possible to exclude situations in which the collaborative manipulation can be executed by one person by satisfying the positional relation (part 1) and setting one satisfying the positional relationship (part 2) or (part 3).

According to the on-vehicle authentication apparatus of the present embodiment described above, by including the acquisition unit 65D which acquires information indicating the content of the manipulation on the vehicle 70 from the detection unit 75 mounted on the vehicle 70, the manipulation determination unit 65E which determines whether a predetermined collaborative manipulation executable by two or more manipulators is performed on the basis of the information acquired by the acquisition unit 65D, the electronic key registration unit 65F which executes a registration process for registering the electronic key 10 of the vehicle 70 in the immobilizer 60 in a case that it is determined that the collaborative manipulation is performed by the manipulation determination unit 65E, and the electronic key deletion unit 65H which executes the invalidation process for invalidating the electronic key 10 registered in the immobilizer 60, it is not possible to execute the registration process or the invalidation process unless the collaborative manipulation is performed by two or more people. Thus, it is extremely difficult for one person to execute the registration process or the invalidation process, and as a result, the security of the vehicle can be improved. In a case that the collaborative manipulation is executed by two people, there is a scene to make a shout to adjust the timing, or it takes more time and labor than the case of manipulating alone. Therefore, it is possible to quietly execute the registration process and the like and to lose motivation of a malicious person who wishes to finish the process earlier.

The aforementioned embodiment can be expressed as follows.

A vehicle authentication apparatus including:

a storage device; and a hardware processor which executes a program stored in the storage device, wherein the hardware processor is configured to acquire information indicating a content of a manipulation on the vehicle from a detection unit mounted on the vehicle, by executing the program, determine whether a predetermined collaborative manipulation executable by two or more manipulators is performed on the basis of the acquired information, and execute a registration process of registering an electronic key of the vehicle in the on-vehicle authentication apparatus or an invalidation process of invalidating the electronic key registered in the on-vehicle authentication apparatus in a case that the collaborative manipulation is determined to be performed.

Although the embodiments for carrying out the present invention have been described above, the present invention is not limited to these embodiments at all, and various modifications and substitutions may be added within the scope not departing from the gist of the present invention.

For example, the first manipulation may be a manipulation on a plurality of first manipulation parts and/or the second manipulation may be a manipulation on a plurality of second manipulation parts. For example, the first manipulation may include a manipulation of pressing the ignition switch 78G and a manipulation of pressing the accelerator pedal 78I, and the second manipulation may include a manipulation indicating the rear gate 77E and a manipulation indicating the bonnet 77F.

The first manipulation may be a plurality of manipulations and/or the second manipulation may be a plurality of manipulations. For example, the first manipulation and the second manipulation may be a manipulation of stepping on the accelerator pedal 78I three times within a predetermined time, a manipulation of turning the head lamp on three or more times within a predetermined time, or a manipulation of closing the rear gates 77E or the bonnet 77F for a plurality of number of times within a predetermined time.

The first manipulation and the second manipulation may be a manipulation on a plurality of first manipulation parts and/or may be a plurality of manipulations. For example, the first manipulation may include a manipulation of pressing the ignition switch 78G and a manipulation of pressing the accelerator pedal 78I, and the second manipulation may include a manipulation of closing the rear gate 77E or the bonnet 77F a plurality of number of times within a predetermined time.

As described above, since the collaborative manipulation becomes more complicated, it takes time and time for confirming the content of the collaborative manipulation, the time and labor for finding the first manipulation part or the second manipulation part, and therefore, it is possible to make a malicious person lose the motivation. As a result, the security of the vehicle can be improved.

The collaborative manipulation may be a manipulation that is difficult for two people to execute and can be executed by three or more people. For example, a case where the positional relationship (part 1) is satisfied and the positional relationship (part 2) is satisfied is included. In addition to the collaborative manipulation on the manipulation part on the opposite side in the width direction of the vehicle 70 among the positional relationship (part 2), a case of including the manipulation on at least one of the manipulation parts on the opposite side in the front-rear direction of the vehicle 70 (the case where the width direction and the front-rear direction are reversed) is also included.

The communication control unit 154 may perform the personal confirmation by the regular owner A or the salesperson B before transmitting the execution key. For example, the communication control unit 154 transmits confirmation information for confirming whether to permit execution of the registration process or the invalidation process of the electronic key 10 with respect to the vehicle 70, to the dealer terminal 40 or the user terminal 20. The confirmation information may include the vehicle body number of the vehicle 70, the date and time in a case that the request was transmitted, and the like. In the dealer terminal 40 or the user terminal 20, a confirmation screen based on the confirmation information is displayed, and a permission/prohibition button for inputting whether to permit the execution of the registration process or the invalidation process is displayed on the confirmation screen. The dealer terminal 40 or the user terminal 20 transmits the manipulation content for the permission/prohibition button to the management server 100. In a case that receiving the information indicating that the permission button is manipulated, from the dealer terminal 40 or the user terminal 20, the communication control unit 154 transmits the execution key Ki to the immobilizer 60 or the like, transmits the execution key Kt to the dealer terminal 40 or the user terminal 20, and transmits the execution key Kd to the diagnosis machine 30.

The electronic key 10 may be substituted by a card key, the user terminal 20, or the like. In the case of the card key, the immobilizer 60 receives the key information from the card key using the card reader provided in the vehicle 70. In the case of the user terminal 20, the immobilizer 60 receives the key information from the user terminal 20, using the wireless communication device (for example, a Bluetooth (registered trademark) unit) provided in the communication unit 50 or the vehicle 70.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle authentication apparatus comprising:

an acquisition unit configured to acquire information indicating a content of a manipulation on a vehicle from a detection unit mounted on the vehicle;

a manipulation determination unit configured to determine whether a predetermined collaborative manipulation executable by two or more manipulators is performed on the basis of information acquired by the acquisition unit; and an execution unit configured to execute a registration process of registering an electronic key of the vehicle in the on-vehicle authentication apparatus or an invalidation process of invalidating the electronic key registered in the on-vehicle authentication apparatus in a case that it is determined by the manipulation determination unit that the collaborative manipulation is performed, wherein in a case that the manipulation determination unit determines that a predetermined first manipulation on a first manipulation part, and a predetermined second manipulation on a second manipulation part, which is in a predetermined positional relationship with the first manipulation part, have been performed at a predetermined timing, it is determined that a collaborative manipulation has been performed, the first manipulation part is a part provided in a passenger compartment of the vehicle, the second manipulation part is a part provided outside the passenger compartment of the vehicle, the first manipulation comprises at least one of a manipulation on a switch for starting the vehicle and a manipulation on a manipulator for controlling traveling of the vehicle, and the second manipulation comprises at least one of an opening and closing manipulation on a rear gate of the vehicle and an opening and closing manipulation on a bonnet.

2. The vehicle authentication apparatus according to claim 1, wherein the first manipulation is a manipulation on a plurality of first manipulation parts and/or
the second manipulation is a manipulation on a plurality of second manipulation parts.

3. The vehicle authentication apparatus according to claim 1, wherein the first manipulation is a plurality of manipulations and/or
the second manipulation is a plurality of manipulations.

4. The vehicle authentication apparatus according to claim 1, wherein the first manipulation part and the second manipulation part are provided on opposite sides in a front-rear direction or a width direction of the vehicle.

5. The vehicle authentication apparatus according to claim 1, wherein a distance between an installation position of the first manipulation part and an installation position of the second manipulation part is equal to or larger than a predetermined value.

6. The vehicle authentication apparatus according to claim 1, further comprising:
a selection unit configured to select any one of a plurality of collaborative manipulations.

7. The vehicle authentication apparatus according to claim 6, wherein the selection unit selects the collaborative manipulation, on the basis of at least one of a vehicle type of the vehicle, a vehicle body number of the vehicle, and a date and a time at which the registration process or the invalidation process is executed.

8. A vehicle authentication apparatus comprising:
an acquisition unit configured to acquire information indicating a content of a manipulation on a vehicle from a detection unit mounted on the vehicle;
a manipulation determination unit configured to determine whether a predetermined collaborative manipulation executable by two or more manipulators is performed on the basis of information acquired by the acquisition unit; and in execution unit configured to execute a registration process of registering an electronic key of the vehicle in the vehicle authentication apparatus or an invalidation process of invalidating the electronic key registered in the vehicle authentication apparatus in a case that it is determined by the manipulation determination unit that the collaborative manipulation is performed, wherein in a case that the manipulation determination unit determines that a predetermined first manipulation on a first manipulation part, and a predetermined second manipulation on a second manipulation part, which is in a predetermined positional relationship with the first manipulation part, have been performed at a predetermined timing, it is determined that a collaborative manipulation has been performed, the first manipulation part and the second manipulation part are provided on opposite sides in a front-rear direction or a width direction of the vehicle, the first manipulation comprises at least one of an opening manipulation and a closing manipulation on a rear gate of the vehicle, and the second manipulation comprises at least one of an opening manipulation and a closing manipulation on a bonnet of the vehicle.

9. The vehicle authentication apparatus according to claim 8, wherein the first manipulation part is a part provided in a passenger compartment of the vehicle, and
the second manipulation part is a part provided outside the passenger compartment of the vehicle.

10. The vehicle authentication apparatus according to claim 8, wherein the first manipulation is a manipulation on a plurality of first manipulation parts and the second manipulation is a manipulation on a plurality of second manipulation parts.

11. The vehicle authentication apparatus according to claim 8, wherein the first manipulation is a plurality of manipulations and the second manipulation is a plurality of manipulations.

12. The vehicle authentication apparatus according to claim 8, wherein a distance between an installation position of the first manipulation part and an installation position of the second manipulation part is equal to or larger than a predetermined value.

13. The vehicle authentication apparatus according to claim 8, further comprising:
a selection unit configured to select any one of a plurality of collaborative manipulations.

14. The vehicle authentication apparatus according to claim 13, wherein the selection unit selects the collaborative manipulation, on the basis of at least one of a vehicle type of the vehicle, a vehicle body number of the vehicle, and a date and a time at which the registration process or the invalidation process is executed.

15. A vehicle authentication apparatus comprising:
an acquisition unit configured to acquire information indicating a content of a manipulation on a vehicle from a detection unit mounted on the vehicle;
a manipulation determination unit configured to determine whether a predetermined collaborative manipulation executable by two or more manipulators is performed on the basis of information acquired by the acquisition unit; and
an execution unit configured to execute a registration process of registering an electronic key of the vehicle in the vehicle authentication apparatus or an invalidation process of invalidating the electronic key registered in the vehicle authentication apparatus in a case that it is determined by the manipulation determination unit that the collaborative manipulation is performed,
wherein in a case that the manipulation determination unit determines that a predetermined first manipulation on a first manipulation part, and a predetermined second medic relation on a second manipulation part, which is in a predetermined positional relationship with the first manipulation part, have been performed at a predetermined timing, it is determined that a collaborative manipulation has been performed,
the first manipulation part and the second manipulation part are provided on opposite sides in a front-rear direction or a width direction of the vehicle,
the first manipulation part is an outer handle which receives a manipulation of opening the door of the vehicle from the outside, and
the second manipulation part is an outer handle provided on a side in the width direction of the vehicle opposite to a side to which the outer handle as the first manipulation part is attached.

16. The vehicle authentication apparatus according to claim 15, wherein the first manipulation is a manipulation on a plurality of first manipulation parts and the second manipulation is a manipulation on a plurality of second manipulation parts.

17. The vehicle authentication apparatus according to claim 15, wherein the first manipulation is a plurality of manipulations and the second manipulation is a plurality of manipulations.

18. The vehicle authentication apparatus according to claim 15, wherein a distance between an installation position of the first manipulation part and a installation position of the second manipulation part is equal to or larger than a predetermined value.

19. The vehicle authentication apparatus according to claim 15, further comprising:
a selection unit configured to select any one of a plurality of collaborative manipulations.

20. The vehicle authentication apparatus according to claim 19, wherein the selection unit selects the collaborative manipulation, on the basis of at least one of a vehicle type of the vehicle, a vehicle body number, and a date and a time at which the registration process or the invalidation process is executed.

* * * * *